US006829892B2

(12) United States Patent
Larson

(10) Patent No.: US 6,829,892 B2
(45) Date of Patent: Dec. 14, 2004

(54) ENGINE EXHAUST SYSTEM PNEUMATIC PUMP

(75) Inventor: Gerald L. Larson, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/358,641

(22) Filed: Feb. 5, 2003

(65) Prior Publication Data

US 2004/0148932 A1 Aug. 5, 2004

(51) Int. Cl.[7] ................................ F02G 1/00
(52) U.S. Cl. ..................... 60/597; 60/620; 60/626
(58) Field of Search ..................... 60/597, 626, 620

(56) References Cited

U.S. PATENT DOCUMENTS

| 3,936,029 | A |   | 2/1976  | Brandt |
| 3,938,486 | A | * | 2/1976  | Oglesby ................... 123/444 |
| 3,994,311 | A |   | 11/1976 | Walle |
| 4,157,656 | A | * | 6/1979  | Walle ...................... 73/49.2 |
| 4,248,190 | A |   | 2/1981  | Grigsby |
| 4,303,053 | A |   | 12/1981 | Etoh et al. |
| 4,345,432 | A |   | 8/1982  | Iida et al. |
| 4,378,692 | A | * | 4/1983  | Walle ...................... 73/49.2 |
| 4,439,114 | A |   | 3/1984  | Kimmell |
| 4,492,192 | A |   | 1/1985  | Baguelin |
| 4,765,304 | A |   | 8/1988  | Brown |
| 4,903,649 | A | * | 2/1990  | Staerzl ..................... 123/73 A |
| 5,230,609 | A |   | 7/1993  | Tseng et al. |
| 5,528,901 | A |   | 6/1996  | Willis |
| 5,997,259 | A |   | 12/1999 | Marshall et al. |
| 6,125,808 | A |   | 10/2000 | Timewell |

* cited by examiner

*Primary Examiner*—Hoang Nguyen
(74) *Attorney, Agent, or Firm*—Jeffrey P. Calfa; Dennis Kelly Sullivan; Susan L. Lukasik

(57) ABSTRACT

A multi-cylinder diesel engine provides split mode operation in which one or more cylinders function as air pumps. Compressed air supplied by the cylinders is amplified and stored to a high pressure air tank from which it may be used to run air brakes or other systems. Improved energy density is achieved over prior art vehicle air systems and an auxiliary air compressor is eliminated.

13 Claims, 7 Drawing Sheets

ENGINE EXHAUST SYSTEM PNEUMATIC PUMP

BACKGROUND OF THE INVENTION

1. Field of the Invention

The invention relates to air compression systems and more particularly, to a pressure amplifying pneumatic pump system operating off of air pumped by a non-firing cylinder of an internal combustion engine.

2. Description of the Problem

Designers of internal combustion engines have long appreciated that such engines can function as air pumps. For example, U.S. Pat. No. 3,365,014 to Clingerman describes a multi-cylinder diesel engine adapted to operate as a self-powered air compressor. This engine provides for shutting off the flow of fuel to a bank of cylinders and then diverting the air pumped by the cylinders to an auxiliary outlet for use. The cylinders continuing to receive fuel power the vehicle and the air pumping cylinders. The compressed air made available can be used to operate auxiliary equipment on the vehicle.

An example of an opportunity to recapture kinetic energy of a vehicle which is otherwise lost during braking would be to use the engine as a pump to compress air. Engine compression braking has long been used as an auxiliary braking system on diesel engine equipped trucks. An example of such a system is the widely used Jepsen engine brake. Engine compression braking operates by cutting off fuel to the cylinders and coupling the vehicle's momentum back to the pistons through the drive shaft. The cylinders' intake valves operate to allow air to be drawn for compression strokes, but the cylinders' exhaust valves are opened at or just before top dead center (TDC) of the pistons' cycles to exhaust the compressed air. The energy expended to compress the air in the cylinders is lost through the exhaust and no rebound energy is returned to the crankshaft through the pistons during the expansion portions of the piston strokes. In this way a substantial portion of an engine's rated power can be applied to braking. An engine incorporating engine compression braking would seem well adapted for operating as an engine pump to recover a proportion of vehicle energy otherwise wasted during braking.

Unfortunately, diverting engine cylinders for use as air compression pumps provides relatively little practical pressure gain. A non-firing cylinder in a diesel engine reliably generates a pressure of about 200 psi and can, under some circumstances, develop 300 psi. Absent modification of the cylinder not even these limited pressures are available for use though. The air typically must be released to some portion of the exhaust system, resulting in a substantial pressure drop. Assuming diversion of the air using a butterfly valve and check valve positioned as close to the exhaust valve from the cylinder as practical, an exhausted air pressure of perhaps 100 psi will be generated. Such low pressures have worked against using the engine itself an air compressor.

As a consequence, pressurized air is usually provided from an auxiliary pump driven by a belt off of the engine. Unless the pump is clutched, this arrangement constitutes a parasitic drag on the engine and has been criticized for this reason. If the system is clutched it adds weight and complexity to the vehicle. Baguelin, U.S. Pat. No. 4,492,192, proposed modifying one cylinder of a diesel engine to introduce an extra valve as an outlet for compressed air to make the cylinder more effective as an air pump. Such a cylinder, while achieving better pressures than 100 psi, is still limited by the compression ratio of the engine. It is also possible to couple air pumps to the vehicle wheels with clutches to provide kinetic energy recapture during braking. These proposals are mechanically complex.

SUMMARY OF THE INVENTION

One object of the invention is to improve the efficiency of motor vehicles equipped with internal combustion engines.

Another object of the invention is to provide an engine driven, high pressure air compression system for use on a motor vehicle.

Still another object of the invention is to eliminate the need for auxiliary, belt driven air compressors.

Yet another object of the invention is to provide a vehicle braking system providing energy recovery.

Another object of the invention is to reduce the need for stored vehicle electrical power.

The invention provides for these and other objects with an engine exhaust driven fluidic amplifier which operates as a high pressure air pump. The engine is preferably a multi-cylinder diesel engine which can be operated in a split mode with one or more cylinders diverted to operation as first stage air compressors. Cylinders operate as air compressors upon cut off of fuel injection to the cylinders. Air exhausted from one or more of the cylinders can be applied by selective positioning of an escape valve as an input to one or more pneumatic amplifiers. The pneumatic amplifiers draw air from the environment and compress the air by a substantial amount over the pressure of the air exhausted from the engine. The output of the pneumatic amplifiers is delivered to a high pressure storage tank. A pneumatic amplifier comprises a shuttle piston having a large area piston head exposed to the exhaust chamber and a small area head exposed to a compression or pumping chamber. A check valve passes air from the pumping chamber to the pressure tank. The fluidic amplifier allows pressurization of a storage tank to levels of 1600 to 1800 psi or higher. Air compressor operation is triggered by reduced air pressure in the storage tank occurring concurrently with the engine operating at a low or negative load.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
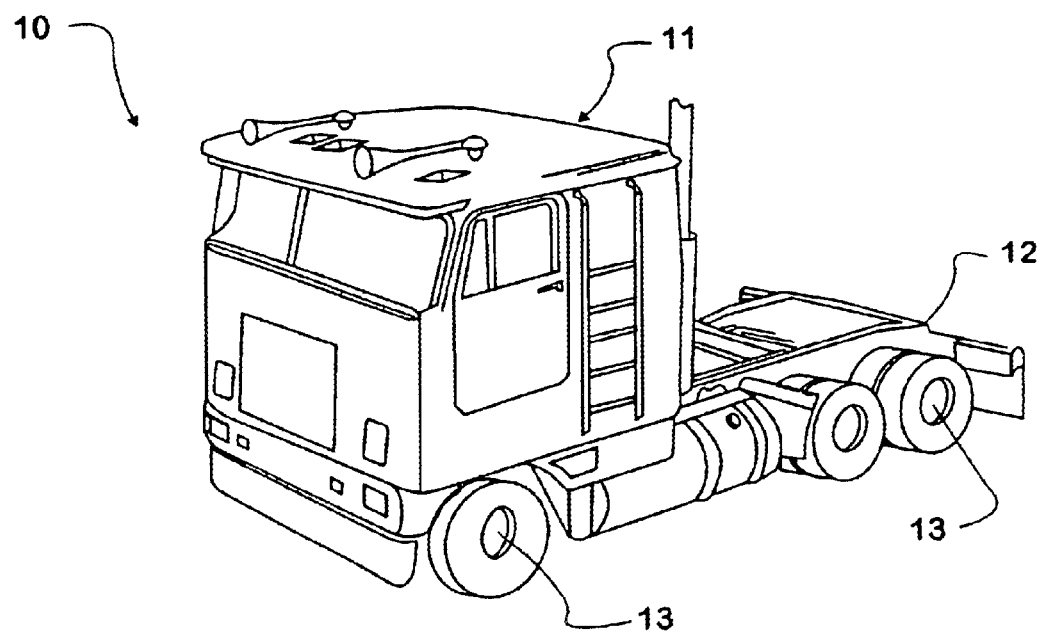
FIG. 1 is a perspective view of a truck with which the invention is advantageously employed.

FIG. 1 illustrates in a perspective view a truck tractor 10 comprising a cab 11 mounted on a chassis 12. A plurality of wheels 13 depend from the chassis. Associated with wheels 13 are a plurality of wheel speed sensors and pneumatic brakes under the control of a conventional anti-lock brake system. Tractor 10 includes the other conventional major systems of a vehicle, including a diesel engine and a transmission and may include an air starter or other air powered devices, as described below. The invention is preferably applied to medium and large trucks which have utilized compressed air systems for brake operation or for starting. These vehicles are typically equipped with a multi-cylinder diesel, which is often adapted for engine compression braking, and compressed air tanks. It will be understood that while the invention is preferably applied to diesels, it would also work, with modification, on internal combustion engines using spark initiated combustion. It may also be advantageously applied to delivery trucks and other vehicles used heavily for stop and go driving.

Figure 2:
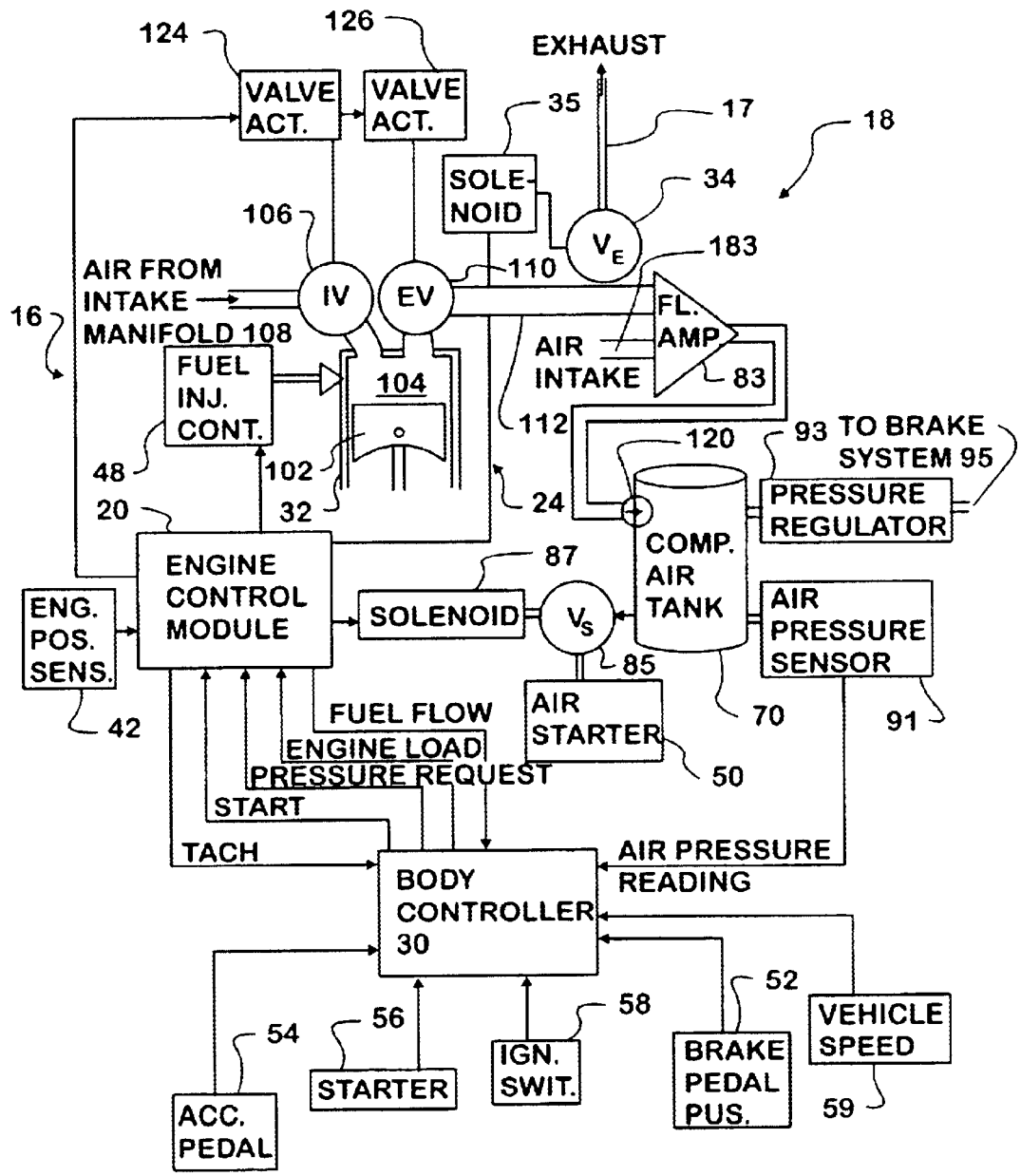
FIG. 2 is a high level schematic diagram showing an exhaust diversion system and compression system in accordance with the invention.

Referring now to FIG. 2 an engine air compression and diversion system 18 is illustrated. Compression system 18 uses one or more of the cylinders 32 of a bank 24 of cylinders of a multi-cylinder diesel engine as a first stage pump. In normal operation a piston 102 moves in a conventional, reciprocating fashion within a cylinder 32 with the result that space 104 between the piston and valves 106 and 110 varies in volume. A diesel is conventionally operated as a four cycle engine. Unless stated otherwise in the discussion that follows, intake valve 106 and exhaust valve 110 may be assumed closed. The first cycle is initiated with piston 102 at the top of its travel in cylinder 32 (referred to conventionally as top dead center ("TDC"). Intake valve 106 is opened and air is drawn into cylinder 32 with the following downstroke of piston 102 through the opened intake valve 106 from an intake manifold 108. Intake valve 106 is closed when piston 102 reaches the bottom of its travel in the piston and the air is compressed by the subsequent upward movement of piston 102. This compression stroke of piston 102 develops an approximately 25 to 1 compression ratio of air in the cylinder, raising the temperature of the air above the ignition point of the fuel. Compression ignition of the fuel which is injected into cylinder 32 as the piston approaches TDC results. The burning air fuel mixture substantially raises pressure in cylinder 32 generating a downward force on piston 102. This produces a downward power stroke of piston 104. An upward exhaust stroke of piston 102 follows for which exhaust valve 110 is opened. During the exhaust stroke the combustion byproduct is exhausted through exhaust valve 110 into a cylinder exhaust chamber 112. Exhaust chamber 112 can pass air or combustion byproducts from cylinder 32 to an exhaust manifold 17, which collects exhaust gas from bank 24 of cylinders, or retain the air for use of the fluidic amplifier 83. The four cycles repeat as long as the cylinder is firing.

Contemporary practice provides for computer based control of many vehicle and engine functions. An engine controller 20 monitors and controls the operation of diesel 16. Engine controller 20 times fuel injection to each cylinder 32 using a fuel injection controller 48. A camshaft rotates in synchronous with a crank shaft, which in turn is coupled to the pistons in cylinders 32. Thus camshaft position is related to the phase of each piston relative to TDC. Fuel injection is timed in relation to the cam phase position, provided by a cam phase (engine position) sensor 42. Fuel injection is handled by an injector controller 48. The timing of closing and opening of the intake valve 106 and an exhaust valve 110 are effected by engine controller 20 through valve actuators 124 and 126, respectively. Engine controller 20 is also used to operate a starter 50. Engine control module 20 controls a solenoid 87 which positions a valve 85 connecting compressed air tank 70 to air starter 50. The pistons of an engine are connected to a rotatable crankshaft (not shown) which is connectable to the drive train and which operates to maintain movement of the pistons during none power strokes.

The intake and exhaust valves may be hydraulically actuated using pressurized engine oil, with the camshaft used to operate hydraulic valves controlling intake and exhaust valve operation. Hydraulic valve control may then be overridden by engine controller 20 through valve controllers 124 and 126. For future camless engines, crankshaft phase position may be substituted for cam phase position to the same effect in coordinating the injection of fuel with piston phase and valve timing. In a camless engine hydraulic valve control uses pressurized engine oil under the control of valve actuators 124 and 126. The position of an exhaust collection or retention valve 34 is coordinated by engine controller 20 using a solenoid 35 as described below.

The engine can be operated in a split mode, or used for engine compression braking, by cutting off fuel to one or more cylinders 32. After fuel is cut off to a pumping cylinder, the cam actuated lifters can continue to operate intake and exhaust valves 106 and 110, however, for more efficient engine compression braking, the intake valve is open during every down stroke and the exhaust valve is briefly opened as the piston 102 approaches TDC. Under conditions where some engine power is required, but air pressure status indicates a need for air, valve operation may be altered, and still allow operation of the high pressure compression system of the invention. It is not usually necessary under these conditions to draw air to a pumping cylinder 32 and it is preferable not to draw air away from the firing cylinders, or to impose as large a load on the engine as would occur if the one cylinder of the engine was operating in effect as a compression brake. For a preferred embodiment of a fluidic amplifier 83, the intake valve 106 may be left closed and the exhaust valve 110 left open after an initial air charge is drawn into cylinder 32 and the fluidic amplifier 83 will continue to supply high pressure air, at least as long as the charge does not leak away. To compensate for such leakage the charge in the pumping cylinder 32 may be occasionally refreshed by opening intake valve 106.

Cylinder 32 operates as an air pump when at least some of the remaining cylinders of the engine continue to fire, or when vehicle momentum is coupled to the engine crankshaft from the transmission. To make use of the compressed air from cylinder 32 with modification of the cylinder, some modification of the exhaust manifold 17, or to the exhaust chamber 112 from an individual cylinder, is required to divert the air to a functional element. An exhaust collection valve 34 is located in the wall of exhaust chamber 112 and connects the chamber with exhaust manifold 17. A fluidic amplifier 83 communicates with the exhaust chamber 112. Modification of the exhaust system for one cylinder 32 to accommodate one exhaust collection valve 34 and fluidic amplifier 83 is illustrated, but it will be understood that an exhaust system can be modified allowing more than one of cylinders 32 to operate as first stage air pumps. It will also be understood that cylinders may have more than one intake or exhaust valve and that illustration of and reference to the cylinders as having a single valve for exhaust and a single valve for intake has been done for the sake of simplicity in illustration only and that provision for additional valves in no way alters the application of the invention to an engine.

Routing of the air exhausted or pumped from cylinder 32 is effected by opening and closing exhaust collection valve 34. A control solenoid 40, under the control of engine controller 20, positions valve 34. When valve 34 is closed, and fuel cut off from cylinder 32, air is pumped from cylinder 32 during an exhaust stroke into fluidic or pneumatic amplifier 83. Pneumatic amplifier draws air from the environment through an intake 183, compresses the air and exhausts the compressed air through a check valve 120 into a high pressure air tank 70. Fluidic amplifier 83 should have a pressure gain factor of about 20 and thus be able to deliver air to compressed air tank at pressures in excess of 2000 psi or twenty times the expected pressure of air from cylinder 32. Exhaust collection valve 34 also operates to release air from the input side of pneumatic amplifier 83 as described hereinafter. Fluid amplifier 83 could in theory be run from combustion by product exhaust gas from cylinder 32 at substantially higher pressures, however, such an arrangement would substantially increase back pressure from the exhaust system and thereby reduce the efficiency of the engine. The 2000 psi pressure level is chosen as the contemporary practical limit for a motor vehicle compressed air storage system. A higher pressure could be used given progress in seals and tank strength at affordable prices for a mass produced vehicle.

Air compression occurs in response to a need for compressed air and availability of engine power to provide energy for pumping. Engine operation as an air pump requires coordination of the operation of fuel injectors, intake valves, exhaust valves and the exhaust diversion valves. Compressed air may be applied to vehicle systems such as an air brake system 95 used by a trailer or by an air starter 50 used for starting a diesel engine. The need for air may thus be equated with a downward variance from the maximum pressure limit for air tank 70. To provide air tank 70 pressure readings, a pressure sensor 91 is provided in fluid communication with air tank 70. Pressure sensor 91 reports air pressure in the tank to a computer such as a body controller computer 30 or to an engine control module 20, depending upon the particular control arrangements provided on a given vehicle. The air pressure in air tank 70 being below the maximum allowed is taken as a request for operating air compression system 18. The degree to which the air pressure falls below the maximum allowed may also be used as an indication of the priority of the request. In order to avoid frequent cycling of the system on and off, air pressure in tank 70 may be required to fall a certain minimum amount below the maximum limit before an air compression system 18 engages. A number of control regimens may be implemented and which regimen is used at a given time may depend upon the pressure level variance. Described here are the mechanisms useful in implementing the regimens.

Finding the preferred periods for operation of the air compression system 18 also requires determining engine load or some other related factor indicative of spare engine capacity. If engine load is low, or better still negative, air compression system 18 can be run at little penalty, or even allow energy to be recaptured. Periods of engine compression braking are an ideal opportunity for air compression operation. Body controller 30 can estimate engine load from engine speed, derived from the output of the engine (or cam phase) position sensor 42, and the fuel flow output from engine control module 20. Body controller 30 also receives inputs from an accelerator pedal/torque request input 54, a starter button 56, an ignition switch 58, a brake pedal position switch 58 and a vehicle speed source 59, all of which may be used to determine other opportunities to initiate air pumping. Under cruising conditions where air tank 70 is fully pressurized, and no demands for air power occur, ESC 30 may determine leakage rates for air tank 70 from periodic sampling of readings from pressure sensor 91.

Figure 3A:
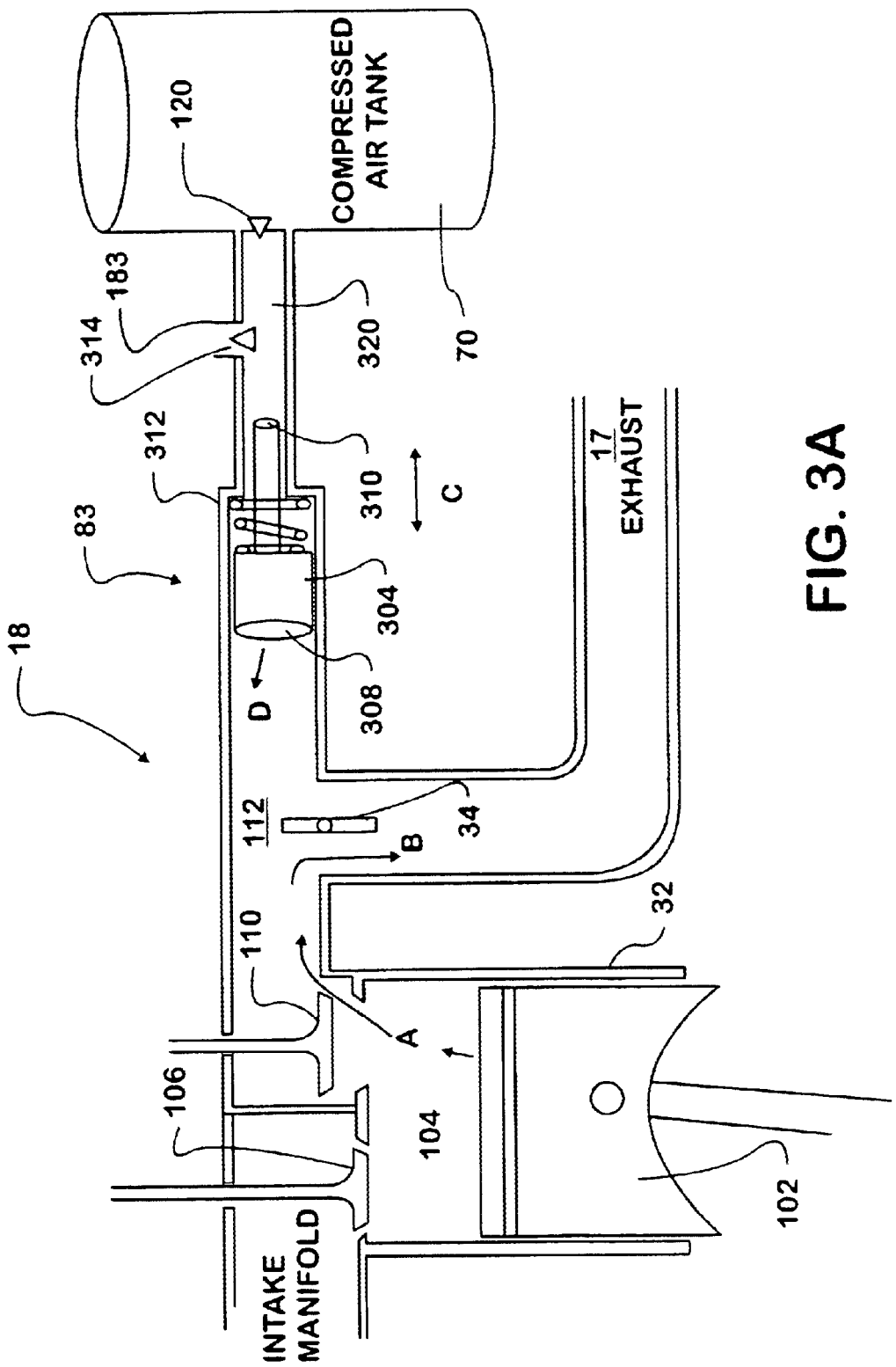
FIGS. 3A–D are schematics of a fluidic amplifier illustrating principals of its operation in accordance with the teachings of the invention.

A preferred embodiment of the invention will now be described with reference particularly to FIGS. 3A–C where a schematic of the pneumatic amplifier 83 and exhaust collection valve 34 are illustrated. Pneumatic amplifier 83 comprises an exhaust chamber 112 functions as a pneumatic amplifier back pressure input chamber. Exhaust chamber 112 is exposed to a working surface 308 of a shuttle piston 304. Shuttle piston 304 is positioned between chamber 112 and pumping chamber 320. Shuttle piston 304 is mounted to reciprocate in the directions indicated by the double headed arrow "C" allowing air in a pumping chamber 320 to be compressed. A working surface 310 of piston 312 is exposed to pumping chamber 320. Working surface 308 has approximately 20 times the exposed surface area of working surface 310 meaning that the pressure in pumping chamber 320 balances the pressure in chamber 302 when it is about 20 times as great, less the rebound force generated by a compression spring 312. Spring 312 is disposed to urge shuttle piston 304 in the direction "D" up to a limit of the shuttle piston's travel. An intake 183 is provided to the pumping chamber 320, which admits air to the chamber through a one way check valve 314. The air drawn into the chamber is preferably dried ambient air. The spring constant of compression spring 312 is selected to substantially prevent movement of shuttle piston 304 during the relatively low transient pressures occurring during the exhaust of combustion gases. Piston 304 may be attached to the interior walls of pneumatic amplifier 83 by a membrane, which would reduce wear and promote a long service life.

An exhaust collection valve 34 is located in the wall of exhaust chamber 112 and is positioned to control pressurization of the chamber and operation of fluidic amplifier 83. Exhaust chamber 112 should be made as small as practical to minimize the pressure drop occurring in gas exhausted from cylinder 32 when exhaust collection valve 34 is closed. As illustrated in FIG. 3A, valve 34 is in its opened position, allowing combustion by-products to escape from cylinder 32. With valves 32 and 34 open, reciprocating piston 102 can force exhaust gas from cylinder 32 through the opened exhaust valve 110 as indicated by arrow "A" into cylinder exhaust chamber 112 and out of exhaust chamber 112 through valve 34 as indicated by the arrow "B" to an exhaust manifold 17.

Figure 3B:
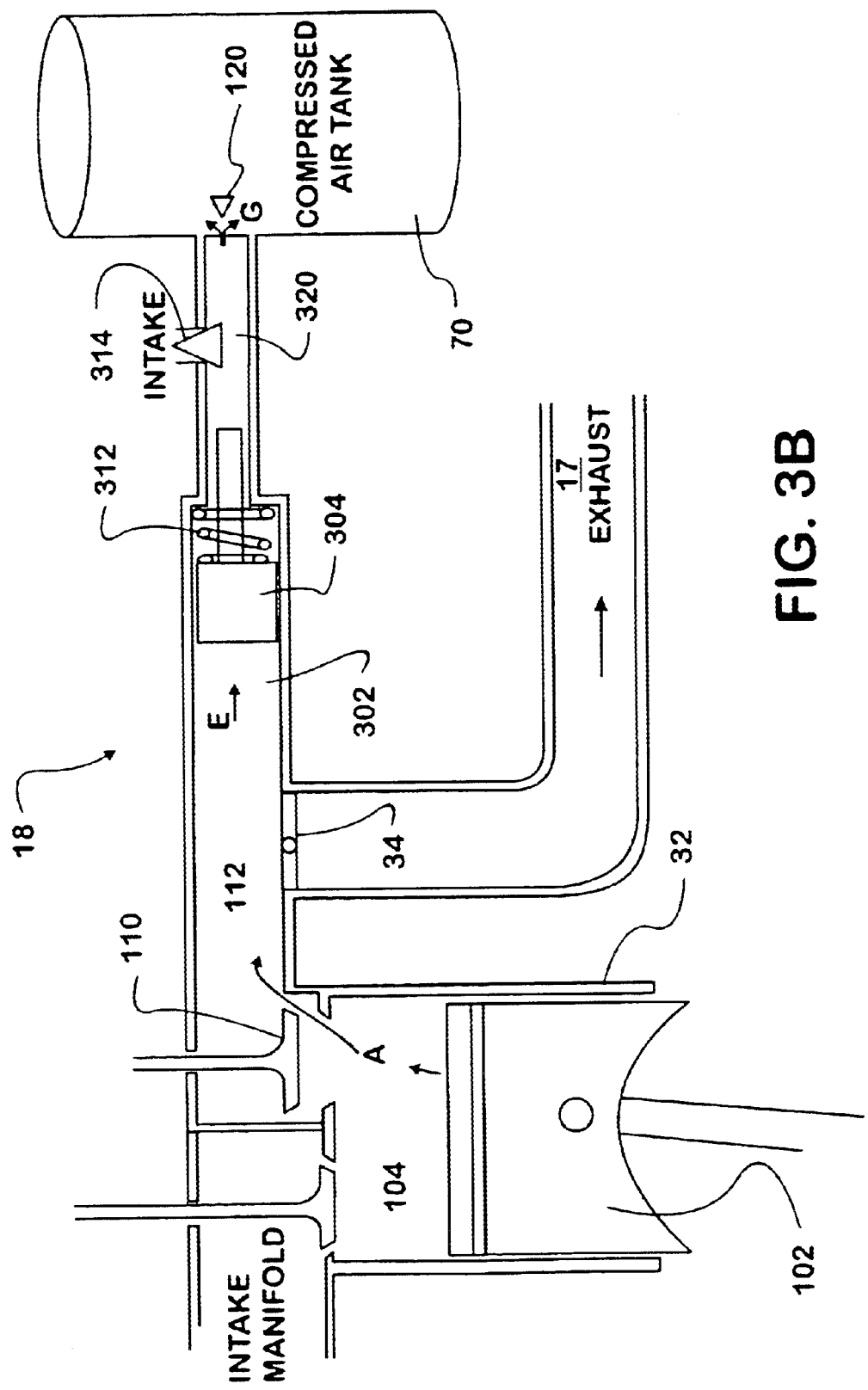

In FIG. 3B pumping of compressed air into compressed air tank 70 is illustrated. Following cessation of fuel injection to cylinder 32 and having drawn a charge of air into cylinder 32, and concurrent with compression stroke of piston 102, exhaust valve 110 opens to allow air to be forced from cylinder 32 indicated by arrow "A". Exhaust collection valve 34 closes access to exhaust manifold 17 preventing the flow of air into the exhaust manifold. As pressure in exhaust chamber 112 increases, the resistance of spring 312 is overcome and shuttle piston 304 is forced in the direction indicated by the letter "E", compressing the air in pumping chamber 320 until check valve 120 admits (arrow "G") the air to compressed air tank 70. Again the gain provided by the difference in exposed surface areas of the two ends of the pistons results in a gain of about 20 to 1 in pressurization. The relative volumes of the exhaust chamber 302 and the pumping chamber 320 and the travel of shuttle piston 304 are chosen so that shuttle piston 304 does not bottom against spring 312 before pressure in the chamber 320 increases sufficiently to balance the pressure in input chamber 302.

Figure 3C:
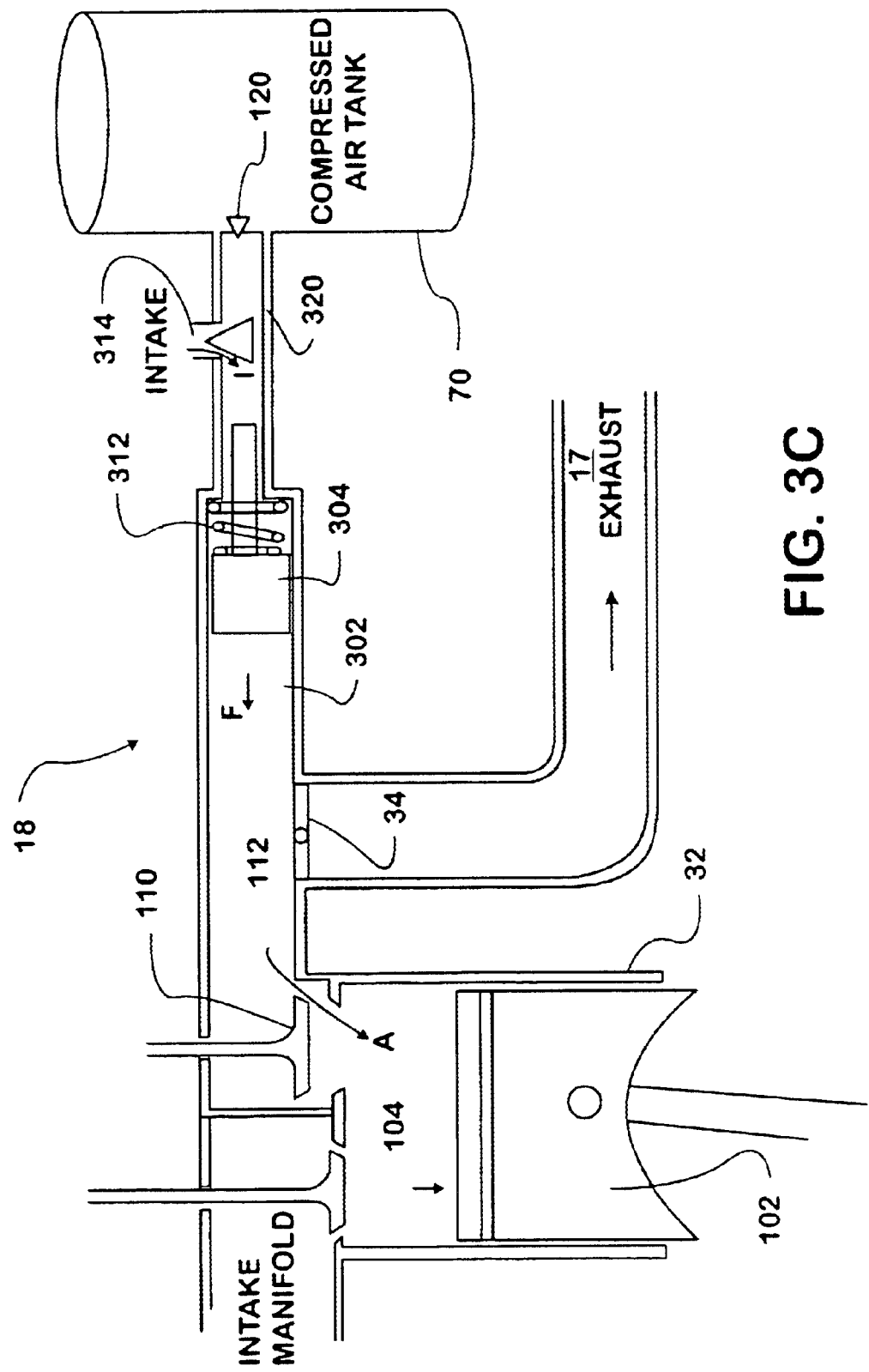

In FIG. 3C a pumping stroke of shuttle piston 304 has completed. Fluidic amplifier 83 may be operated without drawing fresh air with each cycle into cylinder 32. Once a charge of air is drawn into cylinder 32, valves 106 and 34 are kept closed, and valve 110 left open. For subsequent pumping steps, as piston 104 moves downwardly, air is drawn from chamber 112 through exhaust valve 110 back into cylinder 32, pulling shuttle piston 304 back into chamber 302, and thereby drawing air in pumping chamber 320 by a now open check valve 314 as indicated by the arrow "I". Piston 102 reciprocates in cylinder 32 resulting in the same charge of air being forced in and out of exhaust chamber 112. Using this operational sequence it may be possible to eliminate compression spring 312, simplifying pneumatic amplifier 83. The effectiveness of such an arrangement will depend upon the quality of the seal formed by valve 34 and some leakage from exhaust chamber 112 is to be expected. Pumping in this manner may require pressure monitoring in chamber 112 or an occasional opening of intake valve 106 to replenish the charge may be used. A pressurized first stage system might be employed where, rather than drawing a fresh air charge, pumping begins with a charge of combustion by product from cylinder 32. Again the intake valve 106 and exhaust collection valve 34 remain closed and valve 110 would remain open while piston 102 reciprocates. Pumping with valve 106 held closed and valve 110 held open is preferably employed when the engine is under a positive load and it is undesirable that pumping mimic a compression brake or divert air from the firing cylinders.

Figure 3D:
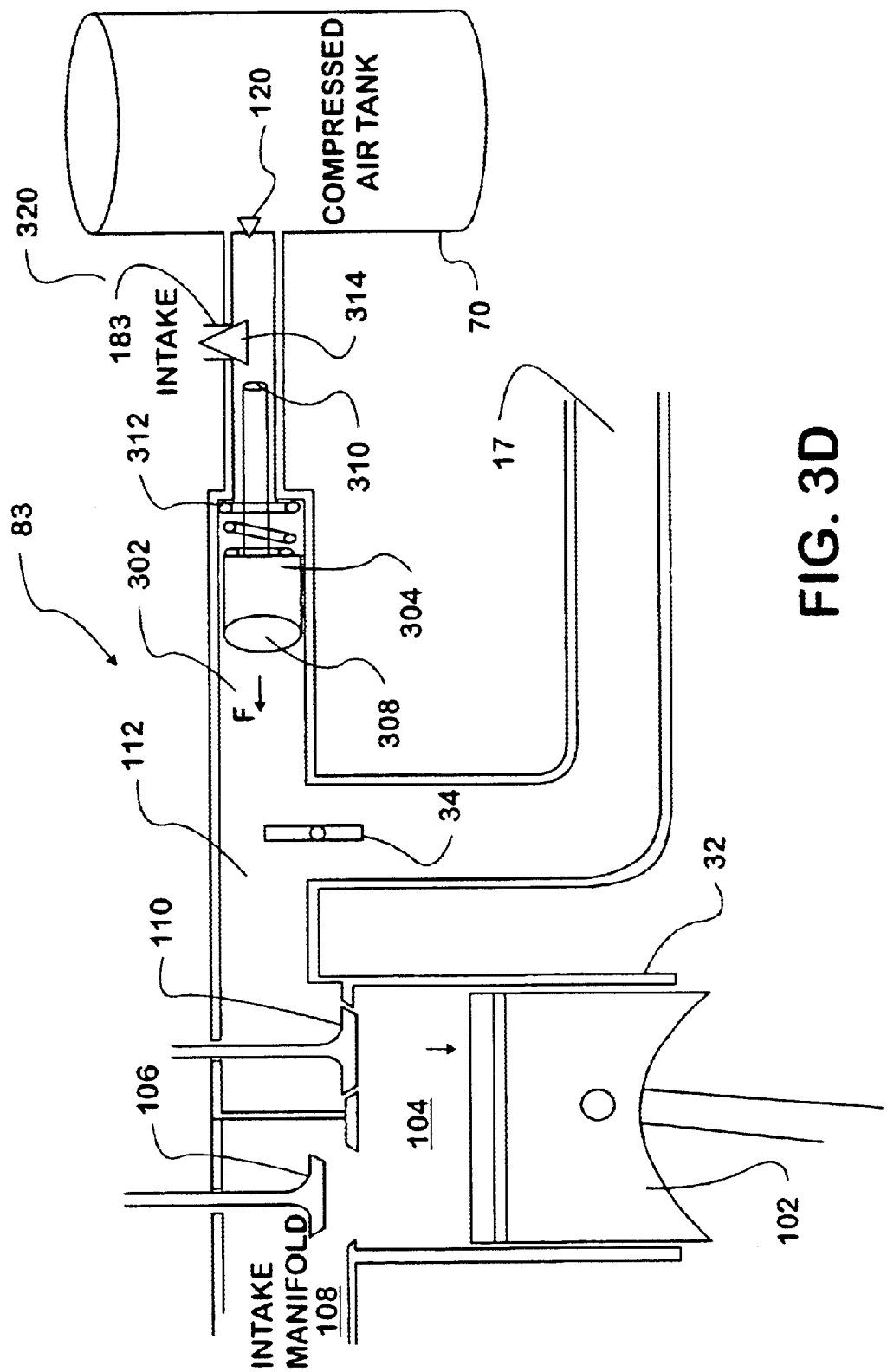

FIG. 3D reflects the configuration of pumping system 18 for recharging fluidic amplifier 83 or for an intake stroke when the engine is being used for a compression brake. Exhaust valve 110 to cylinder 32 has closed and intake valve 106 has opened as piston 102 begins an intake stroke, drawing air from intake manifold 108 into chamber 104. Exhaust collection valve 34 opens allowing air in exhaust chamber 112 and exhaust pipe 118 to escape to the exhaust manifold 17. This results in a pressure drop in chamber 112 which allows a combination of air pressure in pumping chamber 320 and spring 312 to return shuttle piston 304 in the direction indicated by the letter "F" to a neutral position. With movement of the shuttle piston 304, air pressure drops below ambient pressure in pumping chamber 320 and air is drawn through intake 183 and check valve 314 into the pumping chamber.

Figure 4:
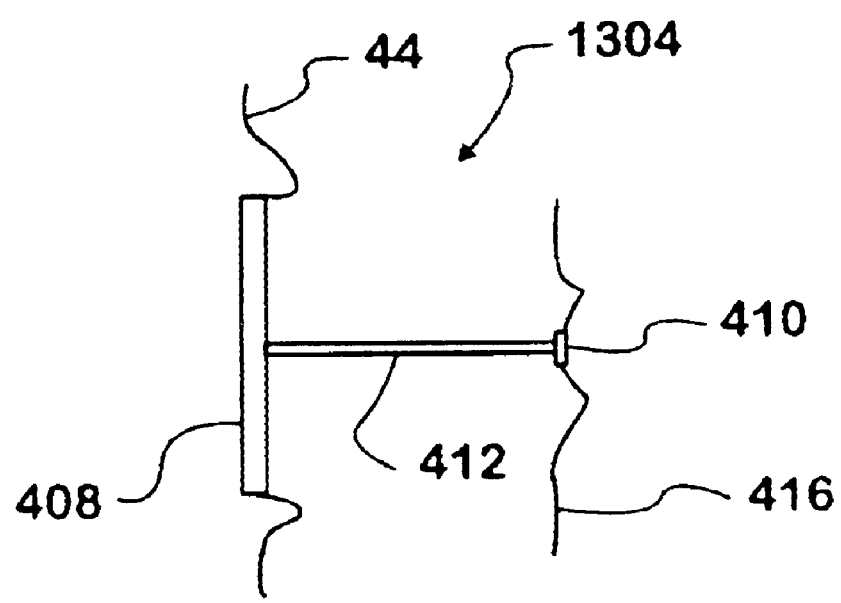
FIG. 4 is a cross sectional view of a shuttle piston for a preferred embodiment of the fluidic amplifier.

FIG. 4 is a detailed schematic illustration of a shuttle piston 1304. Shuttle piston 1304 preferably is of low mass and is suspended in a manner minimizing resistance to its movement. Were piston 1304 considered analogous to a filter or loudspeaker it would minimally damped and have good high frequency response. Piston 1304 and its supporting structures must also be resistant to high temperatures encountered in a vehicle exhaust. To meet these objectives a shuttle piston 1304 comprises two piston heads 408 and 410 mounted on opposite ends of a thin connecting rod 412. Piston heads 408 and 410 are preferably fabricated from a light weight, high temperature resistant aluminum alloy or a ceramic material. They are shaped as thin disks oriented to present a major surface toward the exhaust chamber 112 and the compression or pumping chamber 320, respectively. Piston heads 408 and 410 are suspended from the interior walls of the fluidic amplifier 83 by flexible membranes 414 and 416, respectively, to minimize resistance.

The invention provides for amplifying the output of air pumped by an engine's cylinders to allow higher density energy storage. This improves the efficiency of internal combustion engines used in applications of varying load, particularly applications involving negative loads, as can occur when an engine is used for compression braking by recapturing energy. The invention reduces or eliminates the need for auxiliary air compressors and can be used to reduce the demands for vehicle electrical power.

While the invention is shown in only one of its forms, it is not thus limited but is susceptible to various changes and modifications without departing from the spirit and scope of the invention.

What is claimed is:

1. An internal combustion engine comprising;
   a combustion cylinder having a piston positioned therein for reciprocation;
   an exhaust valve from the combustion cylinder;
   an intake valve to the combustion cylinder;
   an exhaust chamber communicating with a first cylinder communicating through the exhaust valve;
   a secondary exhaust valve from the exhaust chamber;
   a pneumatic amplifier connected to take air pressure in the exhaust chamber as an input, a compression chamber, and a pressure amplifying shuttle piston having first and second surfaces exposed to the exhaust chamber inlet and to the compression chamber, respectively; and
   an inlet to and an outlet from the compression chamber.

2. An internal combustion engine as set forth in claim 1, further comprising means for controlling the positions of the exhaust valve, the intake valve, and the secondary exhaust valve.

3. An internal combustion engine as set forth in claim 2, further comprising:
   an air tank connected to receive pressurized air through the outlet from the compression chamber; and
   a pressure sensor exposed to the air tank for generating an air pressure signal and connected to provide the air pressure signal to the means for controlling.

4. An internal combustion engine as set forth in claim 3, the means for controlling further comprising:
   a body controller for estimating load on the internal combustion engine and responsive to the air pressure signal for requesting resupply of compressed air to the air tank; and
   an engine controller responsive to a request to resupply compressed air and to the estimated load for initiating air pumping by the pneumatic amplifier.

5. An internal combustion engine as set forth in claim 4, the means for initiating air pumping further comprising:
   a fuel injector to the cylinder; a fuel injector controller which can vary the quantity of fuel injected by the fuel injector from a null level upward;
   a controller for positioning the exhaust diversion valve in closed and opened positions; valve controllers for the intake and exhaust valves; and
   means for coordinating cut off of fuel to the cylinder, positioning of the intake valve, exhaust valve and secondary exhaust valve all with movement of the piston for operating the cylinder as a pump.

6. An internal combustion engine as set forth in claim 5, wherein the request to supply compressed air has a plurality of priority levels depending upon the level of the air pressure in the air tank, with a first priority level requiring the supply of compressed air only if the estimate of engine load is negative and a second higher priority level requiring the supply of compressed air if the estimate of engine load indicates reserve power capacity.

7. An internal combustion engine as set forth in claim 5, further comprising:

an air starter;

a discharge control valve coupled between the air tank and the air starter; and a valve controller for opening and closing the discharge control valve.

8. An internal combustion engine as set forth in claim 5, further comprising:

an air brake system;

a discharge valve coupled between the air tank and the air brake system; and a discharge valve controller coupled to the discharge valve controller for opening and closing the discharge valve.

9. A motor vehicles comprising;

a multiple cylinder internal combustion engine;

an air storage tank mounted on the motor vehicle;

an intake valve for each cylinder of the multiple cylinder internal combustion engine;

an exhaust valve for each cylinder of the multiple cylinder internal combustion engine;

an exhaust outlet for each cylinder in fluid communication with the exhaust valve for each cylinder;

a cylinder valve positioning system for opening and closing the intake and exhaust valves;

a fuel injector for each cylinder;

means for interrupting operation of the fuel injector for a first cylinder so that the first cylinder pumps air when the crank shaft is rotating;

a secondary exhaust valve located in the exhaust outlet for the first cylinder;

a pneumatic amplifier having a signal inlet connected to the exhaust outlet for the first cylinder, a draw inlet to a compression chamber and a discharge port from the compression chamber; and an air tank connected to the discharge port of the pneumatic amplifier.

10. A motor vehicle as set forth in claim 9, further comprising:

a pressure sensor coupled to the air tank;

means for estimating engine load; and means for initiating operation of the first cylinder as an air pump in response to the pressure level in the air tank and the engine load.

11. A motor vehicle as set forth in claim 10, the means for estimating engine load further comprising:

a torque request input source;

a tachometer for generating an engine rotational speed signal;

an indicator of fuel flow;

means for determining vehicle speed;

a brake pedal position sensor; and a body controller computer coupled to the torque request input source and brake pedal position sensor and to receive the engine speed signal and indication of fuel flow for estimating engine load.

12. A motor vehicle as set forth in claim 11, the means for initiating being further responsive to an air pressure level below a maximum but above a first minimum for initiating pumping when the estimated engine load is negative and still further responsive to air pressure in the tank being below the first minimum for initiating pumping whenever estimated engine load indicates reserve capacity.

13. A motor vehicle as set forth in claim 12, further comprising an air starter for the engine connectable to the air tank.

* * * * *